US008226269B2

(12) United States Patent
Mateer et al.

(10) Patent No.: US 8,226,269 B2
(45) Date of Patent: Jul. 24, 2012

(54) COLOR MIXER

(75) Inventors: Jeff Mateer, Fort Wayne, IN (US); Keersten Nichols, Columbia City, IN (US); Michael Wood, Austin, TX (US)

(73) Assignee: Apollo Design Technology, Inc., Fort Wayne, IN (US)

(*) Notice: Subject to any disclaimer, the term of this patent is extended or adjusted under 35 U.S.C. 154(b) by 955 days.

(21) Appl. No.: 12/206,561

(22) Filed: Sep. 8, 2008

(65) Prior Publication Data

US 2009/0066843 A1 Mar. 12, 2009

Related U.S. Application Data

(60) Provisional application No. 60/970,636, filed on Sep. 7, 2007.

(51) Int. Cl.
*F21V 9/00* (2006.01)
*G03B 21/14* (2006.01)

(52) U.S. Cl. ........ 362/268; 362/293; 362/231; 362/297; 353/84; 359/890

(58) Field of Classification Search .................. 362/293, 362/231, 297, 305, 268; 348/744, 645
See application file for complete search history.

(56) References Cited

U.S. PATENT DOCUMENTS

| | | | | |
|---|---|---|---|---|
| 5,758,955 | A * | 6/1998 | Belliveau | 362/293 |
| 6,796,683 | B2 * | 9/2004 | Wood et al. | 362/281 |
| 7,832,902 | B2 * | 11/2010 | Belliveau et al. | 362/283 |
| 7,896,525 | B2 * | 3/2011 | Belliveau et al. | 362/282 |
| 8,061,874 | B2 * | 11/2011 | Bornhorst | 362/293 |
| 2003/0206414 | A1 * | 11/2003 | Wood et al. | 362/293 |
| 2006/0007686 | A1 * | 1/2006 | Hough | 362/293 |

* cited by examiner

*Primary Examiner* — Anabel Ton
(74) *Attorney, Agent, or Firm* — Alice O. Martin; Barnes & Thornburg LLP

(57) ABSTRACT

A color mixer for producing a colored beam of light in combination with a light source. The color mixer includes a plurality of color media configured to pass a light beam such that the color media may be repositioned relative to one another to produce a color mixing effect resulting in many available combinations of color and hue.

19 Claims, 5 Drawing Sheets

COLOR MIXER

CROSS REFERENCE TO RELATED APPLICATIONS

The present application claims the benefit of priority to U.S. Provisional Patent Application Ser. No. 60/970,636 filed on Sep. 7, 2007.

BACKGROUND

The present disclosure relates to a color mixer for producing a colored beam of light, for example, in a theatrical lighting fixture. In theater, stage, and other entertainment production applications, it is often desirable to project a colored light beam. Initially, this was accomplished by using colored glass, followed by colored gelatin. The current term "gel" refers generally to theatrical lighting color filters and is derived from this past use of gelatin as a color-filtering medium. Sheets of dyed polyester (called "gels") are now standard within the industry for lighting color filter applications.

It is also desirable to be able to project more than one color from a single lighting fixture. Rotating color wheels provided multiple colors, however, such color wheels proved to be too large, and too limited in the number of colors available.

A further desirable feature is the ability to produce a colored light beam of varying hues. For example, it may be desirable to project a light beam at a stage in colors ranging from white light to a very deep shade of blue, symbolizing a transition from day to night. Gel strings accomplish this transition by comprising an assembly of numerous individual frames of color attached together to create a gel having a color gradient ranging from clear to a deep hue of a particular color, such as blue in the previous example.

Gel strings may be used in combination with a motor drive system to remotely position the desired color in front of a light source. Such motor drive systems are referred to as color scrollers and are commercially available, such as the Smart Color® line of scrollers from Apollo Design Technology, Inc. of Fort Wayne, Ind. However, color scrollers are limited to the number of individual frames that can be coupled together, thus limiting the color gradient. The highest number of frames available on color scrollers is presently 32. Designers of theatrical programs frequently need more colors than the limited palette offered by current products.

SUMMARY

The present disclosure relates to a color mixer having a plurality of color media configured to pass a light beam such that the color media may be repositioned relative to one another to produce a color mixing effect resulting in many available combinations of color and hue.

The color mixer of the present disclosure employs a plurality of color media. The exemplary embodiment contains two color media, each color media comprising a gel string. One gel string contains graduated frames of cyan and yellow. The second gel string contains graduated frames of yellow and magenta. By combining a magenta frame with a yellow frame a shade of red is produced. Combinations of magenta and cyan produce blue while combinations of yellow and cyan produce greens.

Each of the gel strings includes a selection of hues in gradients of the cyan, yellow and magenta frames. The makeup of these two gel strings greatly increases the number of hues available in the ranges that the human eye is most sensitive. The human eye can detect extremely small changes in blue, purple and red hues. However, the eye can only detect large changes in yellow and greens. This phenomenon is documented in a color graphic known as the MacAdam ellipses. See MacAdam, D. L., *Visual Sensitivities to Color Differences in Daylight*, J. Opt. Soc. Am. (1942). Therefore, it is desirable to have a two-string color-mixing device that creates a large quantity of incrementally small changes in blues, purples and reds. It is also desirable for a two-string color-mixing device that creates a small quantity of incrementally large changes in greens and yellows.

BRIEF DESCRIPTION OF THE DRAWINGS

The present disclosure will be described hereafter with reference to the attached drawings which are given as non-limiting examples only, in which.

DETAILED DESCRIPTION

Figure 1:
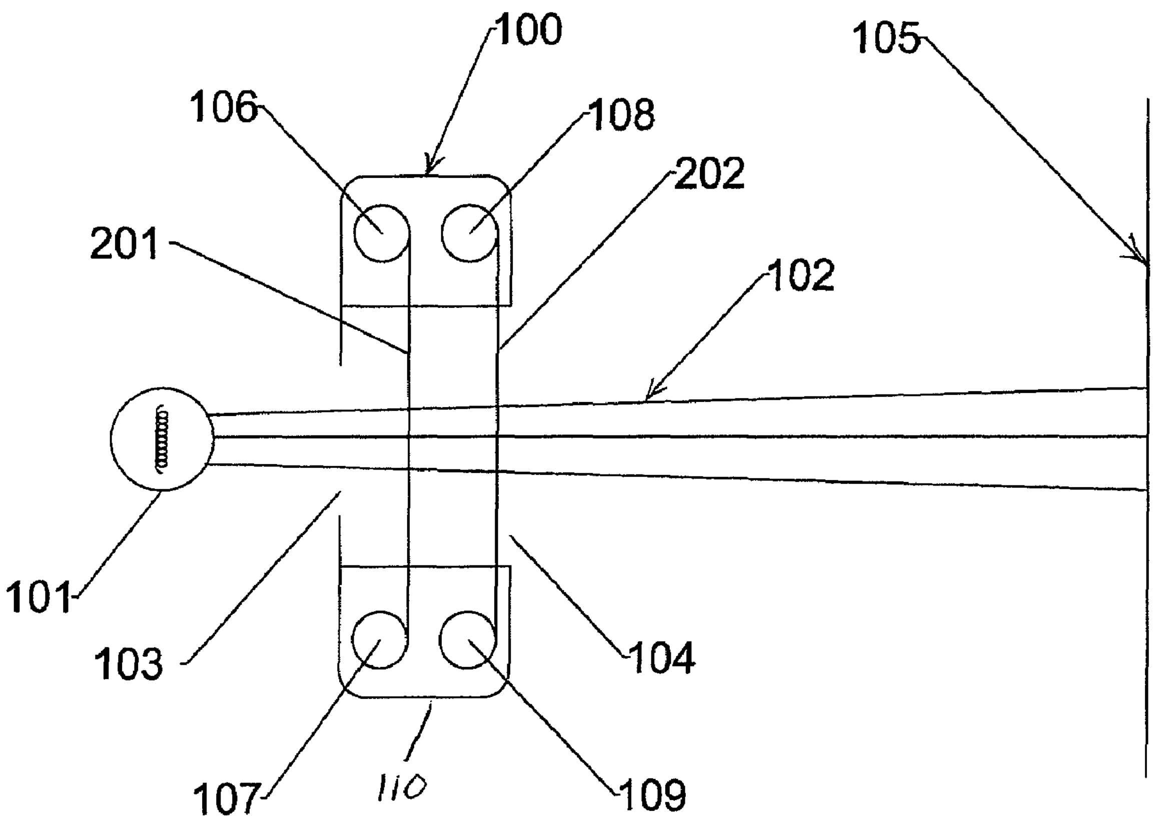
FIG. 1 is a representation of the placement of the color mixer of the present disclosure in relation to a light source and the placement of the color media in the mixer.

The color mixer 100 of the present disclosure is shown relative to a light source 101 and its associated light beam 102 in FIG. 1. The nature of a light beam in a theatrical light is such that the light beam width is most narrow nearest to the light source and increases as the distance from the light increases. Color mixer 100 includes a housing 110, including a first aperture 103 positioned on the side of the housing nearer light source 101 and a second aperture 104 opposite the first aperture. Light beam 102 is projected from the light source 101 and is passed through a first aperture 103 located proximate to light source 101, a first color medium 201, a second color medium 202, and a second aperture 105 and arrives at a projection surface 105. First aperture 103 is configured to be smaller than second aperture 104 due to the smaller diameter of light beam 102 nearer light source 101.

Color mixer 100 includes spools 106 and 107 to facilitate moving first color medium 201. Color mixer 100 also includes spools 108 and 109 to facilitate moving second color medium 202. In the exemplary embodiment, spools 106, 107, 108, and 109 may be motorized and coupled to a controller allowing an operator to remotely position first and second color media 201, 201 relative to each other and light source 101. Various portions of 201 can be positioned in the light beam 102.

Figure 2:
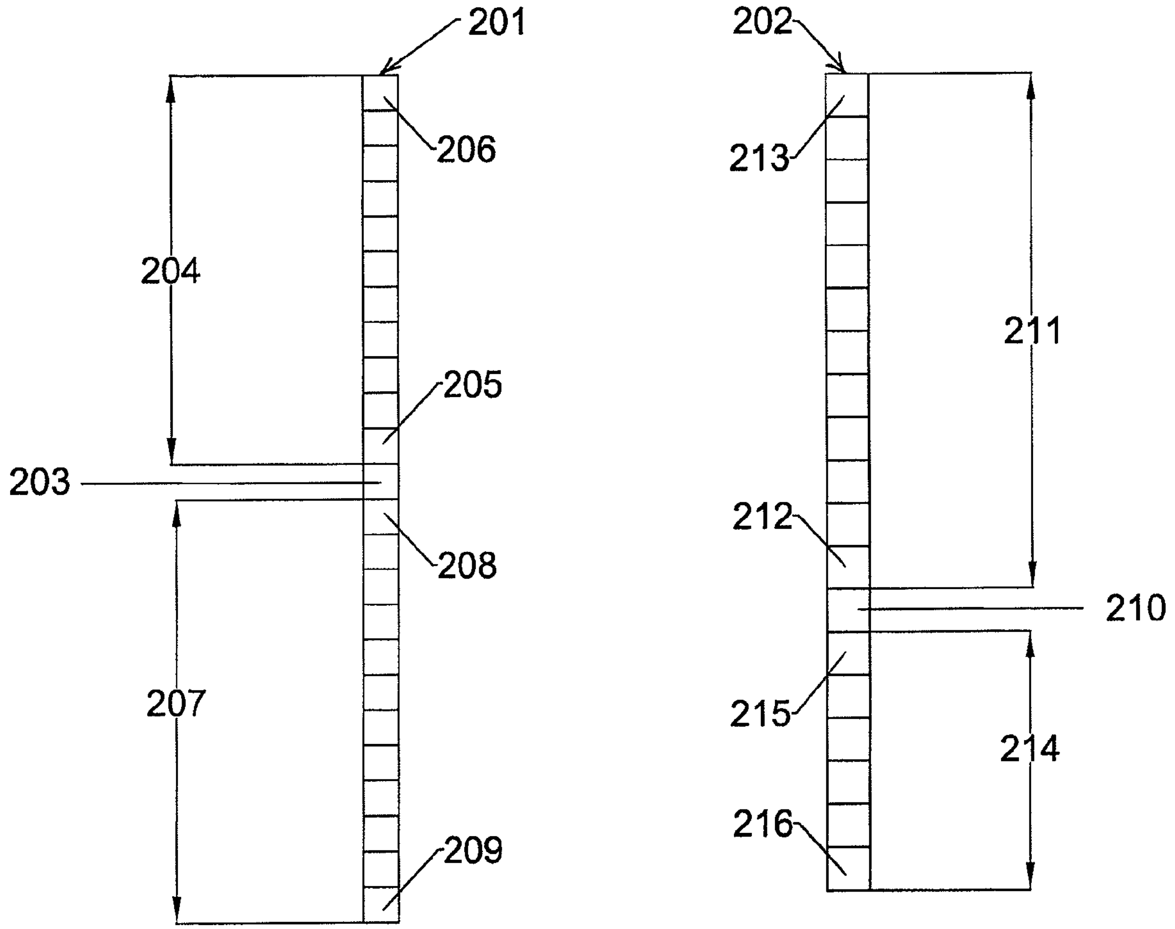
FIG. 2 represents the layout of the color media.

First and second color media 201, 202 are positioned adjacent and apart from each other within color mixer 100, as shown in FIG. 1. In the present disclosure, the selection of hue, percentage of saturation, and frame quantity, of each of the cyan, yellow and magenta frames have been chosen to take advantage of how the human eye perceives hue. The human eye is more sensitive to changes in hues of indigo, blues and reds. The human eye is less sensitive to orange, yellows and greens. FIG. 2 shows a vertical representation of color media 201 and 202. In the exemplary embodiment, each color medium comprises a plurality of color frames. Color medium 201 takes advantage of being closer to the light source 101. Since the light beam 102 is narrower at this point, the width of the color frames can be narrower. More frames can then be assembled while limiting the overall length of the gel string.

First color medium 201 includes a plurality of color frames, including a clear frame 203, a plurality of yellow hue frames 204, and a plurality of cyan hue frames 207. Clear frame 203 is positioned near the midpoint of color medium 201. Section 204 is made up of a plurality of yellow hue frames, having the lightest yellow hue 205 adjacent clear frame 203 and deepest yellow hue 206 at one end of color medium 201. Section 207 is made up of a plurality of cyan hue frames, having the lightest cyan hue 208 adjacent clear frame 203 and deepest cyan hue 206 at the opposite end of color medium 201.

Second color medium 202 is positioned farther from the light source 101 than color medium 201. Since the light beam 102 is wider as it passes through color medium 202, the width of the color frames must be wider. Fewer frames can be assembled to limit the overall length of the gel string.

Second color medium 202 includes a plurality of color frames, including a clear frame 210, a plurality of magenta hue frames 211, and a plurality of yellow hue frames 214. Clear frame 210 is positioned offset from the midpoint of the color medium 202 due to the second color medium 202 having more magenta frames 211 than yellow frames 214. Section 211 is made up of a plurality of magenta hue frames, having the lightest magenta hue 212 adjacent clear frame 210 and deepest magenta hue 213 at one end of color medium 202. Section 214 is made up of a plurality of yellow hue frames, having the lightest yellow hue 215 adjacent clear frame 210 and deepest yellow hue 216 at the opposite end of color medium 202. There are a fewer number of yellow hue frames included in section 214, than for the other sections 204, 207, and 211. This results in a shorter color medium 202 and limits creation of an unnecessary amount of green hues.

Figure 3:
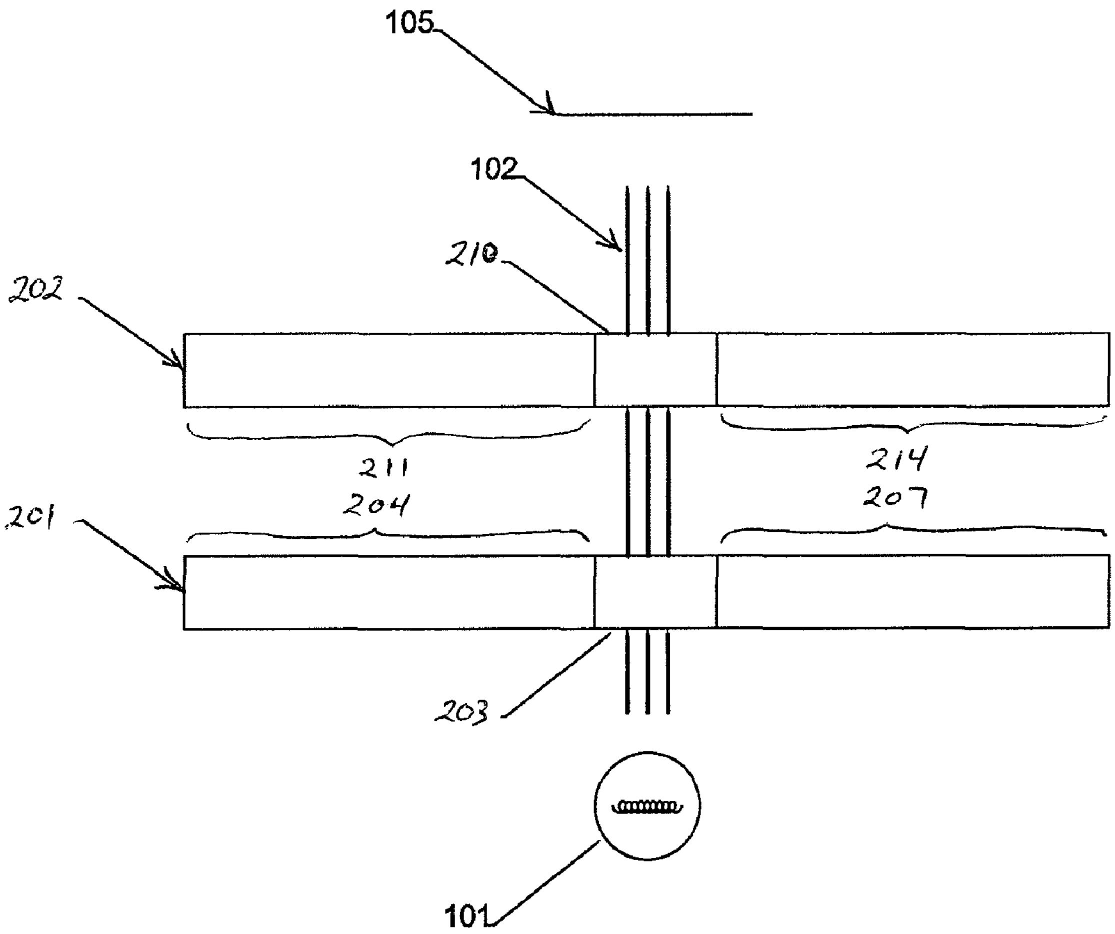
FIG. 3 shows the color media positioned to create a clear light.

To produce a beam of white light, first color medium 201 and second color medium 202 are configured such that clear frames 203 and 210 are aligned, allowing light beam 102 to pass through color mixer 100 without filtering, as shown in FIG. 3. With color media 201 and 202 configured in this arrangement, the light beam 102 projects onto projection surface 105 as white light.

Figure 4A:
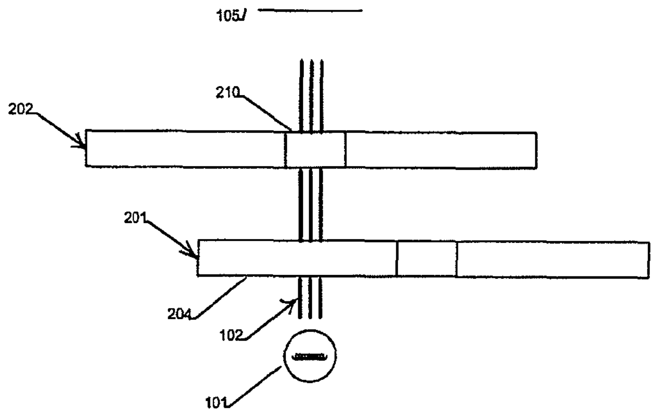
FIGS. 4A, 4B and 4C show the color media positioned to create many hues of cyan, yellow and magenta.
Figure 4B:
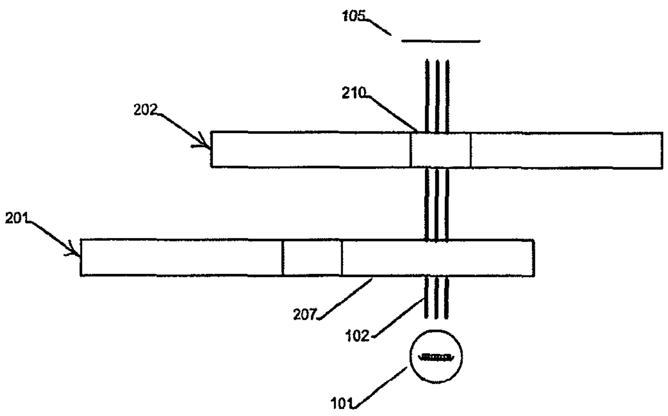
Figure 4C:
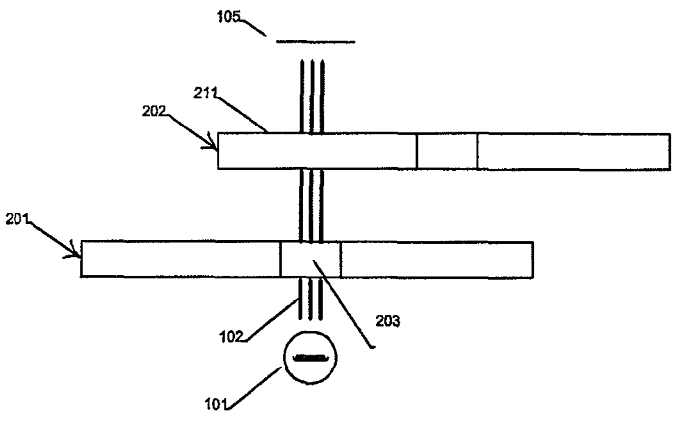

FIGS. 4A-4C show the color media 201, 202 configured to produce the various primary colors of yellow, cyan, and magenta. To produce a yellow light beam, first color media is configured such that a frame of yellow section 204 of the first color medium 201 is aligned with clear frame 210 of the second color medium 202, as shown in FIG. 4A. In this configuration, light beam 102 is filtered as it passes through yellow section 204 and clear frame 210, resulting in a yellow light projecting onto projection surface 105. In this configuration, first color medium 201 may be adjusted based on the desired depth of color desired from the lightest yellow hue 205 to the deepest yellow hue of frame 206, including any of the frames of varying yellow hue therebetween. This allows any hue of yellow to be produced at projection surface 105.

To produce a cyan light beam, first color media is configured such that a frame of cyan section 207 of the first color medium 201 is aligned with clear frame 210 of the second color medium 202, as shown in FIG. 4B. In this configuration, light beam 102 is filtered as it passes through cyan section 207 and clear frame 210, resulting in a cyan light projecting onto projection surface 105. In this configuration, first color medium 201 may be adjusted based on the desired depth of color desired from the lightest cyan hue 208 to the deepest cyan hue of frame 2096, including any of the frames of varying cyan hue therebetween. This allows any hue of cyan to be produced at projection surface 105.

To produce a magenta light beam, first color medium 201 is configured such that clear frame 203 is aligned with a frame of magenta section 211 of the second color medium 202, as shown in FIG. 4C. In this configuration, light beam 102 is filtered as it passes through magenta section 211 and clear frame 203, resulting in a magenta light projecting onto projection surface 105. In this configuration, second color medium 202 may be adjusted based on the desired depth of color desired from the lightest magenta hue 212 to the deepest magenta hue of frame 213, including any of the frames of varying magenta hue therebetween. This allows any hue of magenta to be produced at projection surface 105.

Figure 5A:
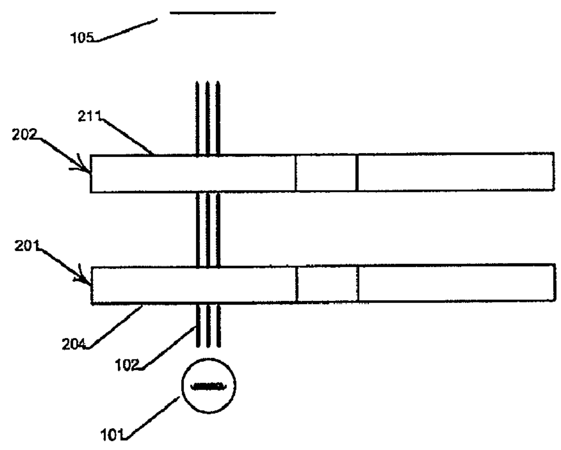
FIGS. 5A, 5B and 5C show the color media positioned to create many hues of red and blues while limiting the creation of unnecessary greens.
Figure 5B:
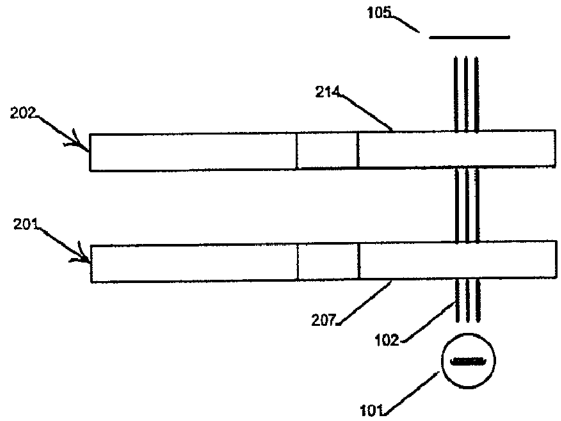
Figure 5C:
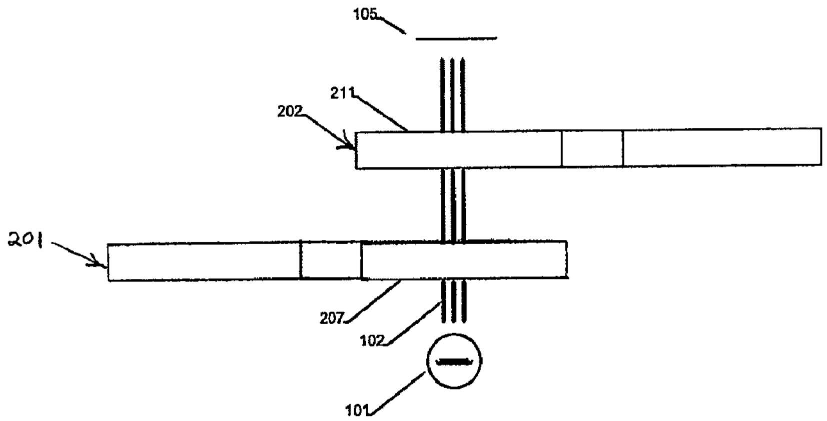

FIGS. 5A-5C show the color media 201, 202 configured to mix the various primary colors of yellow, cyan, and magenta to produce red, green, and blue hues. To produce a red light beam, first color medium 201 is configured such that a frame of yellow section 204 is aligned with a frame of magenta section 211 of the second color medium 202, as shown in FIG. 5A. In this configuration, light beam 102 is filtered as it passes through yellow section 204 and magenta section 211, resulting in a red light projecting onto projection surface 105. In this configuration, since sections 204 and 211 each vary in hue from light to deep, first and second color media 201 and 202 may be adjusted based on the desired depth of color desired and shade of red desired.

To produce a green light beam, first color medium 201 is configured such that a frame of cyan section 207 is aligned with a frame of yellow section 214 of the second color medium 202, as shown in FIG. 5B. In this configuration, light beam 102 is filtered as it passes through cyan section 207 and yellow section 214, resulting in a green light projecting onto projection surface 105. In this configuration, since sections 207 and 214 each vary in hue from light to deep, first and second color media 201 and 202 may be adjusted based on the desired depth of color desired and shade of green desired. Since section 207 varies in hue from 208 to 209 and section 214 has limited hues from 215 to 216, a limited number of greens can be produced at projection surface 105. This limitation is desirable since the human eye only detects large changes in green, requiring only limited green gradations.

To produce a blue light beam, first color medium 201 is configured such that a frame of cyan section 207 is aligned with a frame of magenta section 211 of the second color medium 202, as shown in FIG. 5C. In this configuration, light beam 102 is filtered as it passes through cyan section 207 and magenta section 211, resulting in a blue light projecting onto projection surface 105. In this configuration, since sections 207 and 211 each vary in hue from light to deep, first and second color media 201 and 202 may be adjusted based on the desired depth of color desired and shade of blue desired.

As should be apparent, by adjusting color media 201, 202 to align various hues of yellow, cyan, and magenta, along with the clear frames, a full spectrum of colored light may be produced. Additionally, it is contemplated that color media 201 and 202 comprise colored portions comprising sections of continuously variable color gradient, instead of discrete hue frames. A color medium having such a continuously variable color gradient has colored sections 204, 207, 211, and 214 that gradually deepen in hue without a perceptible step in gradation. It is further contemplated that more than two color media may be utilized and still be within the scope of the present disclosure. For example, three color media may be used, one color media for each of the yellow, cyan, and magenta hues. Also, the present disclosure is not limited to theatrical gel strings, but may employ any suitable color filter media.

While an embodiment has been illustrated and described in the drawings and foregoing description, such illustrations and descriptions are considered to be exemplary and not restrictive in character, it being understood that only an illustrative embodiment has been shown and described and that all changes and modifications that come within the spirit of the invention are desired to be protected. The applicant has provided description and figures, which are intended as an illustration of certain embodiments of the disclosure, and are not intended to be construed as containing or implying limitation of the disclosure to those embodiments. There are a number of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods that incorporate one or more of the feature of the disclosure and fall within the spirit and scope of the present disclosure as defined by the impendent claims.

We claim:

1. A color mixer for producing a colored light beam from a light source for projection onto a surface, the color mixer comprising:

a first color media comprising a first colored section having a color gradient from a faint hue of a first color to a deep hue of the first color, a first clear section adjacent to the first colored section, and a second colored section adjacent the clear section, the second colored section having a color gradient from a faint hue of a second to deep hue of the second color, a second color media comprising a third colored section having a color gradient from a faint hue of a third color to a deep hue of the third color, a second clear section adjacent to the third colored section, and a fourth colored section adjacent the second clear section, the fourth colored section having a color gradient from a faint hue of the first color to a deep hue of the first color, a first positioner coupled to the first color media and a second positioner coupled to the second color media, wherein the first and second positioners align the first and second color media in a predetermined configuration to produce a desired color light beam; and a housing, the housing configured to include a first aperture, and a second aperture, wherein the first aperture is disposed in a side of the housing near the light source, and wherein the second aperture is disposed in a side of the housing opposite the first aperture.

2. The color mixer of claim 1 wherein the first aperture is configured to be smaller than the second aperture.

3. The color mixer of claim 1 wherein the first color media comprises a first colored section including a plurality of colored frames, the colored frames being arranged in progressively deepening hue wherein a frame having the lightest hue is disposed adjacent the clear section and wherein the frame with the deepest hue is disposed at an end of the first colored section away from the clear section.

4. The color mixer of claim 3 wherein the first color media comprises a second colored section including a plurality of colored frames, the colored frames being arranged in progressively deepening hue wherein a frame having the lightest hue is disposed adjacent the clear section and wherein the frame with the deepest hue is disposed at an end of the second colored section away from the clear section.

5. The color mixer of claim 4 wherein the second color media comprises a third colored section including a plurality of colored frames, the colored frames being arranged in progressively deepening hue wherein a frame having the lightest hue is disposed adjacent the clear section and wherein the frame with the deepest hue is disposed at an end of the third colored section away from the clear section.

6. The color mixer of claim 5 wherein the second color media comprises a fourth colored section including a plurality of colored frames, the colored frames being arranged in progressively deepening hue wherein a frame having the lightest hue is disposed adjacent the clear section and wherein the frame with the deepest hue is disposed at an end of the fourth colored section away from the clear section.

7. The color mixer of claim 6 wherein the first colored section and the fourth colored section are the same color.

8. The color mixer of claim 6 wherein each frame in the plurality of colored frames comprising the first colored section and the second colored section is sized to correspond to the width of a beam of light at a first location and the plurality of frames comprising the third colored section and fourth colored section are sized to correspond to the width of the beam of light at a second location, wherein the beam of light has a smaller width at the first location than at the second location such that the size of the frames comprising the first colored section and the second colored section are smaller than the frames comprising the third colored section and the fourth colored section.

9. The color mixer of claim 8 wherein the first colored section is yellow, the second colored section is cyan, the third colored section is magenta, and the fourth colored section is yellow.

10. The color mixer of claim 1 wherein the first color media and the second color media are formed from a polyester film.

11. The color mixer of claim 1 wherein the first positioner and second positioner are configured to cooperate in moving the first color media and the second color media relative to each other.

12. The color mixer of claim 11 wherein the first positioner comprises a first spool and a second spool, wherein a first end of the first color media is disposed about the first spool and a second end of the first color media is disposed about the second spool, wherein the spools are configured for rotational motion whereby linear motion is imparted to the first color media allowing for movement of the first color media with respect to the light beam.

13. The color mixer of claim 12 wherein the second positioner comprises a third spool and a fourth spool, wherein a first end of the second color media is disposed about the third spool and a second end of the second color media is disposed about the fourth spool, wherein the spools are configured for rotational motion whereby linear motion is imparted to the second color media allowing for movement of the second color media. with respect to the light beam.

14. A color mixer for producing a colored light beam from a light source for projection onto a surface, the color mixer comprising:

a housing, the housing configured to include a first aperture disposed on a side of the housing facing the light source, and a second aperture disposed in a side of the housing opposite the first aperture, wherein the first aperture is sized to be smaller than the second aperture;

a first color media disposed within the housing, the first color media comprising a first colored section having a color gradient from a faint hue of a first color to a deep hue of the first color, the color gradient being comprised of a plurality of frames, the frames being arranged in progressively deepening hue, a first clear section adjacent to the first colored section, and a second colored section adjacent the clear section, the second colored section having a color gradient from a faint hue of a second to deep hue of the second color, the color gradient being comprised of a plurality of frames, the frames being arranged in progressively deepening hue, a second color media disposed within the housing, the second color media comprising a third colored section having a color gradient from a faint hue of a third color to a deep hue of the third color, the color gradient being comprised of a plurality of frames, the frames being arranged in progressively deepening hue, a second clear section adjacent to the third colored section, and a fourth colored section adjacent the second clear section, the fourth colored section having a color gradient from a faint hue of the first color to a deep hue of the first color, the color gradient being comprised of a plurality of frames, the frames being arranged in progressively deepening hue, and a first positioner disposed within the housing coupled to the first color media and a second positioner disposed within the housing coupled to the second color media, wherein the first and second positioners align the first and second color media relative to each other in a predetermined configuration to produce a desired color light beam, wherein the frames comprising the first and second color gradients are sized to be smaller than the frames comprising the third and fourth color gradients.

15. The color mixer of claim 14 wherein the first colored section is yellow, the second colored section is cyan, the third colored section is magenta, and the fourth colored section is yellow.

16. The color mixer of claim 14 wherein the first color media and the second color media are formed from a polyester film.

17. The color mixer of claim 14 wherein the first positioner and second positioner are configured to cooperate in moving the first color media and the second color media relative to each other.

18. The color mixer of claim 17 wherein the first positioner comprises a first spool and a second spool, wherein a first end of the first color media is disposed about the first spool and a second end of the first color media is disposed about the second spool, wherein the spools are configured for rotational motion whereby linear motion is imparted to the first color media allowing for movement of the first color media with respect to the light beam.

19. The color mixer of claim 18 wherein the second positioner comprises a third spool and a fourth spool, wherein a first end of the second color media is disposed about the third spool and a second end of the second color media is disposed about the fourth spool, wherein the spools are configured for rotational motion whereby linear motion is imparted to the second color media allowing for movement of the second color media with respect to the light beam.

* * * * *